United States Patent Office 3,557,493
Patented Jan. 26, 1971

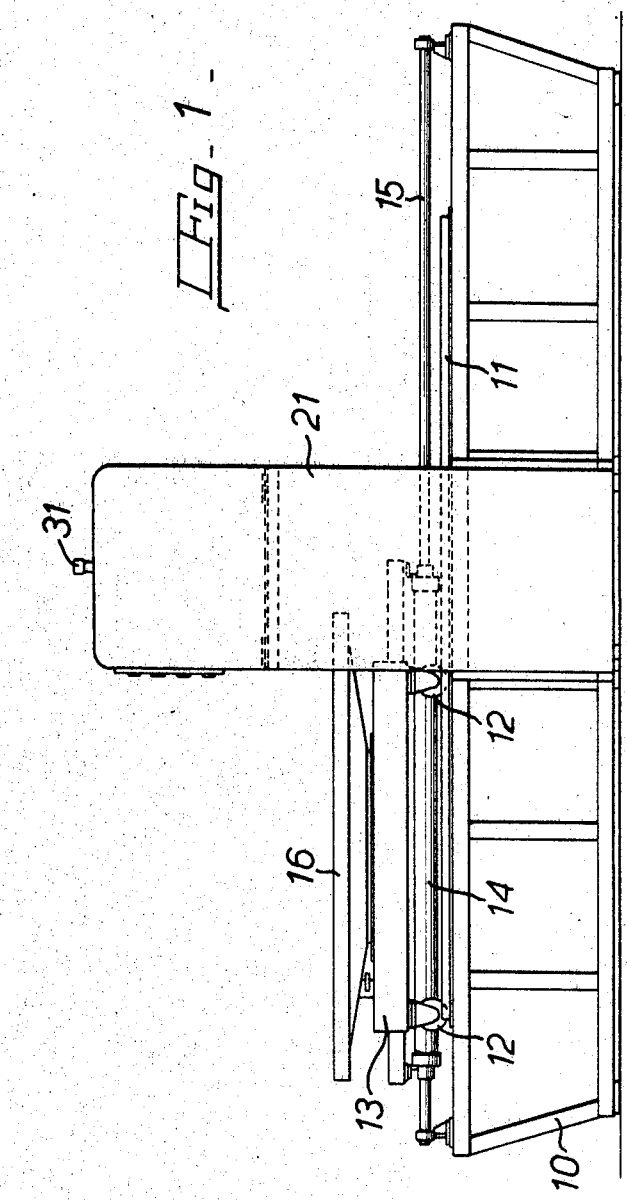

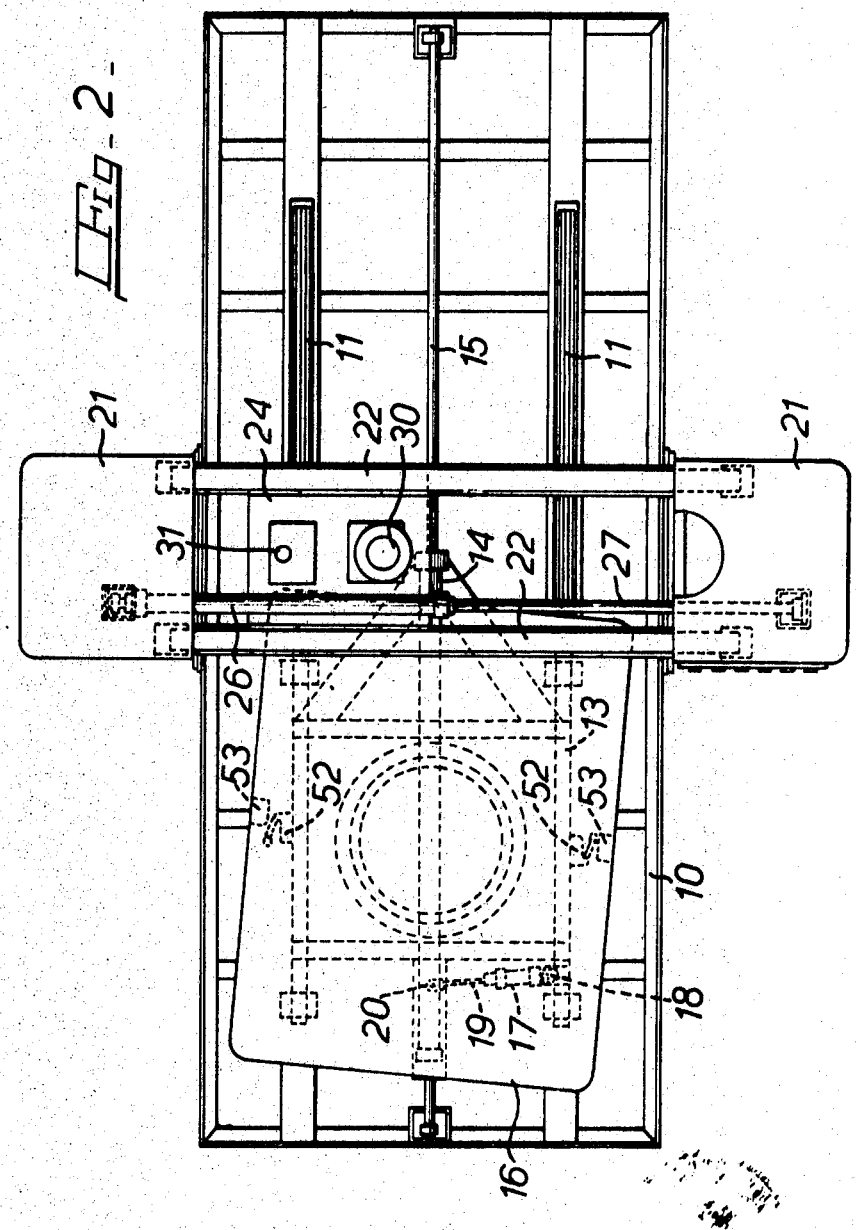

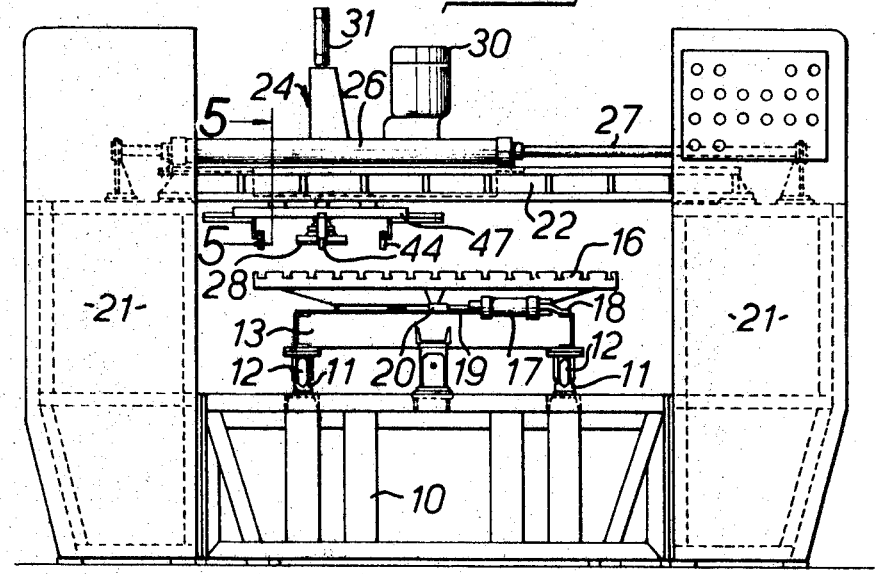
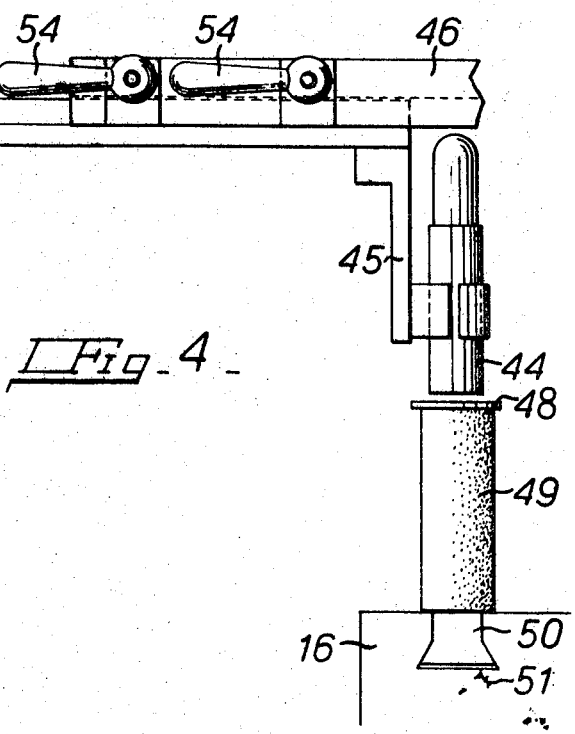

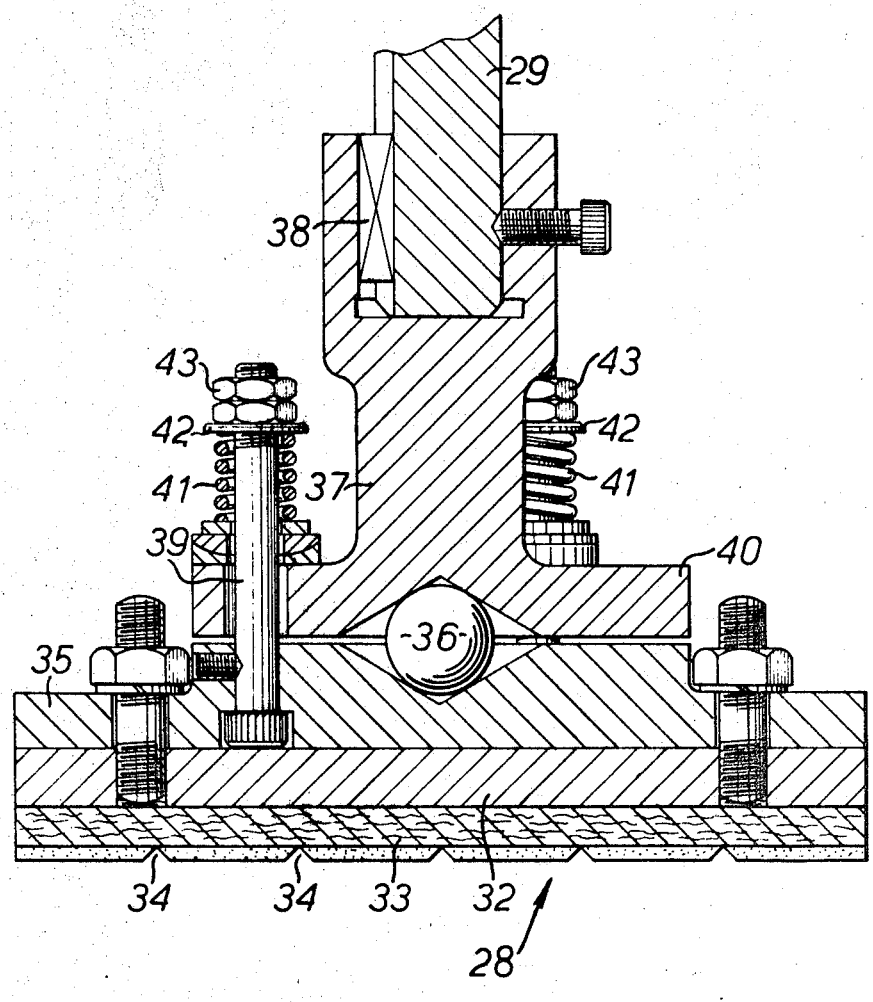

3,557,493
POLISHING OF GLASS
Walter Cuthbert and David Hampson, Birmingham, England, assignors to Triplex Safety Glass Company Limited, Birmingham, England, a British company
Filed Feb. 19, 1968, Ser. No. 706,383
Claims priority, application Great Britain, Feb. 18, 1967, 7,835/67
Int. Cl. B24b 7/00, 9/00
U.S. Cl. 51—56                                           7 Claims

ABSTRACT OF THE DISCLOSURE

A machine for polishing a face of a glass article having a stand with a first carriage reciprocally mounted thereon and which carries a support means for the article to be polished. A rotary polishing head is carried by a second carriage which is mounted for reciprocatory movement in a direction transverse to the path of movement of the first carriage. First and second drive means are operative in use to reciprocate the carriages. In addition the support means is rotatably mounted on the first carriage and a third drive means is provided to cause it to oscillate relatively to the carriage. Also at least one of the drive means is pneumatic so that the movement of the support means relative to the polishing head is somewhat indeterminate.

---

Figure 5:
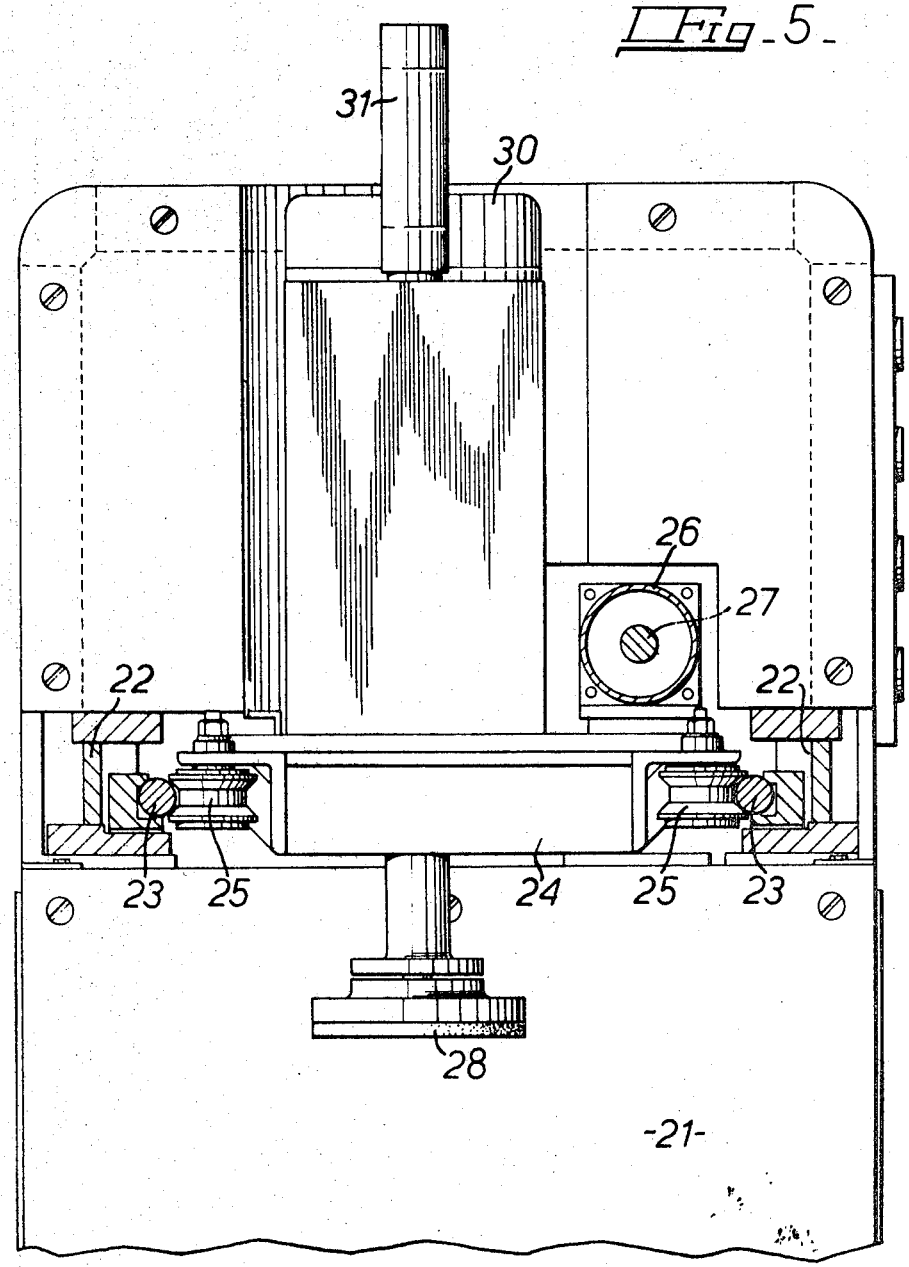

From one aspect the present invention consists in apparatus for polishing the surface of a glass article comprising a rotatable member operative in use to rotate a polishing head, support means for the article, and drive means operative in use to cause relative movement between the rotating polishing head and an article on the support, the drive means being such that in a polishing period of normal duration each part of the surface of the article is polished to substantially the same extent, but that the drive is indeterminate at least to an extent such that in a polishing period of normal duration the polishing head does not repeatedly follow exactly the same path over the surface.

It is already known to provide machines for polishing the surface of a sheet of glass, but each of these machines is such that the polisher follows a predetermined, regular path over the surface of the glass. The result is that polishing patterns are formed on the polished surface. Such patterns are not particularly noticeable under many conditions and may reveal themselves only when the polished surface is viewed under particular types of illumination. Further, polishing patterns do not generally cause any noticeable distortion in images viewed through the glass. Thus for many purposes polishing patterns are tolerable. Nevertheless it is sometimes necessary or desireable to avoid the presence of polishing patterns, and this can be effected by using apparatus in accordance with the invention.

From another aspect the present invention consists in a glass article polished by apparatus in accordance with that aspect of the invention outlined above.

An embodiment of apparatus in accordance with the invention will now be more particularly described with reference to the accompanying drawings, in which FIG. 1 is a side view of the apparatus, FIG. 2 is a plan view of the apparatus, FIG. 3 is an end view of the apparatus as seen from the left hand end of FIG. 1, FIG. 4 is an enlarged and amplified view of part of FIG. 3, FIG. 5 is a section, to a larger scale, along the line 5—5 of FIG. 3, and FIG. 6 is a section, to a larger scale through the polishing head.

The apparatus illustrated is intended for use in polishing the surface of glass sheet. The apparatus comprises a base 10 of open-work construction made from steel sections. The base 10 is a generally rectangular shape in plan, and as can be seen from FIG. 2 is rather more than twice as long as it is wide. On top of the base 10 are mounted a pair of horizontal, grooved rails 11 which are parallel with each other and with the longer sides of the rectangular base. The wheels 12 of a four-wheeled, lower carriage 13 run in the grooves in the rails 11, and the carriage 13 can be moved to and fro, length-wise of the base 10, by means of a first pneumatic piston-and-cylinder unit. The cylinder 14 of the unit is mounted on the underside of the middle of the carriage 13, parallel with the rails 11, and the piston, inside the cylinder 14, is fixed to the middle of a piston rod 15 which extends through the ends of the cylinder and is secured at its ends to the ends of the base 10.

A rectangular table 16 which in use constitutes a support for the glass to be polished is mounted on the carriage 13 so as to be rotatable about a vertical axis through the centre of the table and the centre of the carriage. The width of the table 16 is rather less than the width of the base 10, and the length of the table is somewhat less than half the length of the base. The table 16 can be caused to oscillate about its centre by means of a second piston-and-cylinder unit, the cylinder 17 thereof extending horizontally and being pivoted at one end 18 to the carriage 13, about a vertical axis, and the piston rod 19 being pivoted to the underside of the table 16 about a parallel axis 20. In a typical arrangement the second piston-and-cylinder unit is such that the table 16 can be rotated 5° on either side of a mean position in which the longer sides of the table are parallel with the longer sides of the base 10. When the table 16 is rotated in this way its corners come close to but do not project beyond the sides of the base as can be seen in FIG. 2.

Half way along each of the longer sides of the base 10, and secured to the base, is an upstanding pillar 21 of generally rectangular shape in plan, the pillars being fabricated from steel sections and being enclosed with panelling. The pillars 21 abut the base 10 but do not overhang it. The upper parts of the pillars 21, above the level of the table 16, are interconnected by a pair of parallel beams 22 each of which supports a rail 23 of circular cross-section (see FIG. 5), the axes of the rails 23 being in a common horizontal plane. An upper carriage 24 is disposed between the rails 23 and has four wheels 25, two engaging each rail. Each wheel 25 rotates about a vertical axis and is formed with a circumferential groove into which the associated rail 23 projects. Thus the flanges on each wheel 25, above and below the groove, prevent upward or downward movement of the carriage 24 by their engagement with the rail 23. The upper carriage 24 carries the cylinder 26 of a third pneumatic piston-and-cylinder unit, the piston of the unit having a piston rod 27 which is parallel with the rails 23 and projects from both ends of the cylinder 26, its ends being secured in the pillars 21. At each end of its path of travel the carriage 24 enters a recess in the adjacent pillar. The upper carriage 24 also carries a polishing head 28 which is secured to the lower end of a vertical spindle 29 which extends through the carriage 24. The spindle 29 is splined or similarly keyed to a driving bush (not shown) rotatably mounted on the carriage 24 and driven through the intermidiary of a toothed belt by an electric motor 30 also mounted on the carriage. The spindle 29 is thus able to move vertically with respect to the carriage 24, and its vertical movement is controlled by a fourth pneumatic piston-and-cylinder unit 31 of which the cylinder is secured above the spindle 29 with its axis aligned with that of the spindle, and of which the piston rod is connected through a rotationally free coupling to the spindle.

As shown in FIG. 6 the polishing head 28 comprises a metal disc 32 with a circular pad 33 secured to its lower surface, the pad 33 being formed on its lower surface with grooves 34 of inverted V-section. A circular plate 35 is secured to the upper surface of the disc 32. A conical depression is formed in the centre of the upper surface of the plate 35 and receives the lower part of a steel ball 36. The upper part of the ball 36 enters a similar recess in the centre of the lower surface of a housing 37 secured and keyed by key 38 to the lower end of the spindle 29, the spindle projecting into a blind axial hole in the top of the housing. The recesses and the ball 36 are such that there is a small gap between the plate 35 and the housing 37 to allow for slight tilting of the axis of the head relative to that of the spindle 29. Three threaded pins 39 project upwards from the plate 35 through holes in a radially extending flange 40 on the lower part of the housing 37 and helical compression springs 41 on the pins 39 act between the upper surface of the flange 40 and washers 42 backed by nuts 43 engaging the threaded upper ends of the pins. The pins 39 are arranged symmetrically around the axis of the head, and the arrangement is such that the pad 33 is biased to a horizontal position but can be tilted somewhat in any direction against the action of the springs 41. This tilting my be necessary to enable the apparatus to polish surfaces which are not truly planar but have slight irregularities.

It will be appreciated from the foregoing description that when pressurized air is introduced to each end alternately of the cylinders 14, 17 and 26 respectively of the first, second and third piston-and-cylinder units the lower carriage 13 reciprocates lengthwise of the base 10, the table 16 oscillates about a vertical axis through its centre, and the upper carriage 24, with the polishing head 28, reciprocates transversely of the base 10, above the table 16. In use a sheet of glass to be polished is mounted flat on the table 16 and its upper surface is engaged by the polishing head 28 which is rotated by the electtic motor 30 and pressed downwards onto the glass sheet by the fourth piston-and-cylinder unit 31. An abrasive in liquid form, known as glass-polishers' rouge, is applied to the pad 33 of the polishing head 28, and the pad is rotated at a sufficient speed and with sufficient pressure to polish the glass. The mechanism of polishing is not wholly understood, but it is believed that in addition to the small quantity of glass removed from the surface by the abrasive there is some flow of the glass which is encouraged by the heat generated. In a typical polishing operation a polishing head six inches in diameter rotates at about 100 r.p.m. In other polishing operations polishing heads eighteen inches in diameter are used.

If the polishing head 28 were to pass too far over the edge of the glass sheet being polished excessive pressure would be applied to the relatively small area under the head, and there might be a tendency for the head to tilt. In either case the margin of the glass would be excessively abraded and become somewhat tapered in cross-section. In order to avoid this it is essential to control the relative movements of the glass sheet and the head 28. This is effected by a plurality of micro-switches and proximity switches, which control the supply of pressurized air to the piston-and-cylinder units.

Four proximity switches 44 are mounted symmetrically around the polishing head (they are omitted from FIG. 5 for clarity). Each switch 44 is secured to a bracket 45 which can slide along an arm 46 of a mounting 47 of cross-like shape in plan which is secured to the upper carriage 24. Each bracket can be secured in any desired position along its associated arm by means of manually operable grips 54. Two of the arms 46, on opposite sides of the head 28, are parallel with the direction of move-ment of the lower carriage 13, and two arms, also on opposite sides of the head 28, are parallel with the direction of movement of the upper carriage 24.

The proximity switches 44 respond to the presence of metal strips, one of which, 48, is shown in FIG. 4. The metal strips are secured in a plane just below that of the lower faces of the switches 44 and are secured at a predetermined distance outside the edge of the sheet of glass to be polished. If the sheet is rectangular the strips will form a rectangular frame, if the sheet is of some other shape the strips will be shaped similarly. In use, when the lower carriage 13 moves in either direction lengthwise of the base 10 a transverse metal strip eventually operates switch 44 on that arm 46 pointing towards the end of the base from which the lower carriage has come. Operation of the switch 44 causes reversal of the movement of the lower carriage 13, so that the carriage is reciprocated. Similarly, when the upper carriage 24 moves in either direction transversely of the base 10 the leading switch 44 is eventually operated by one of the metal strips, and this operation causes reversal of the movement of the upper carriage. The upper carriage 24 is thus caused to reciprocate.

The arrangement is made such that in use the axis of rotation of the polishing head 28 does not approach the edge of the glass being polished more closely than about one inch.

The metal strips, of which strip 48 is typical, are mounted at the top of flexible rubber pillars, one of which is shown at 49, the lower ends 50 of which are of dove-tail shape and can be snapped into parallel, longitudinally extending slots 51 of complementary shape formed in the table 16. (The slots 51 are omitted from FIG. 2 for clarity). The extent of oscillation of the table 16 is controlled by a pair of micro-switches 52 on the lower carriage 13 which are engaged alternatively by associated abutments 53 on the underside of the table. Although the abutments 53 may be adjustable their positions would not normally be varied in practice. The extent of oscillation of the table 16 is thus independent of operation of the switches 44.

In addition to receiving the lower ends 50 of the supporting pillars 49 the slots 51 in the table 16 also receive blocks (not shown) carrying stops for locating the glass sheet to be polished and preventing movement of the sheet relative to the table.

The first, second and third piston-and-cylinder units are arranged to reciprocate with different periods, the first unit having the longest period, the second unit the shortest period and the third unit a period of intermediate length. The arrangement is such that in use the polishing head tends to pass over all or almost all of the upper surface of the gass sheet during every few consecutive reciprocations of the first unit. In a typical arrangement the period of the first unit is 20 seconds, that of the second unit is 3 seconds and that of the third unit is about 7 seconds. The periods may be adjusted, and the arrangement may be such that the rate of movement of any unit in one direction is different from that in the other direction. During a normal polishing operation, which may typically be of one hour's duration each part of the surface is polished to substantially the same extent and it is found that although there is naturally a tendency for the polishing head 28 to follow similar paths over the surface of the glass it is also found that exactly the same path is not repeatedly followed as would be the case if the relative movements of the glass sheet and the polishing head were controlled by a single driving motor through the intermediary of toothed gearing or the like. This indeterminate or random component of the movement is due to uncontrolled variations in the pressure, temperature and flow of the pressurized air, as well as minute variations in operation of the proximity switches 44 and micro-switches 52. The inclusions of an indeterminate or random component in the relative movement between the polishing head and the glass being polished is in fact one of the essential features of the present invention.

Although some degree of randomness can readily be introduced by the use of pneumatic piston-and-cylinder units other methods can also be employed. For example the relative movement between the polishing head and the glass may be effected with the aid of one or more hydraulic piston-and-cylinder units or with the aid of unsynchronized electric motors. In another alternative there may be a single motor driving a plurality of separate mechanisms each of which brings about a different relative movement between the glass and the polishing head, at least one of the mechanisms being driven through the intermediary of a device such as fluid coupling which varies somewhat in an indeterminate or random manner.

In the appendant claims reference is made to first, second and third driving units, it should be noted that inas far as the apparatus illustrated in the accompanying drawings is an embodiment of the apparatus claimed the first piston-and-cylinder unit (cylinder 14) corresponds to the first driving unit of the claims, the second piston-and-cylinder unit (cylinder 17) corresponds to the third driving unit of the claims, and the third piston-and-cylinder unit (cylinder 26) corresponds to the second driving unit of the claims.

What we claim is:

1. Apparatus for use in polishing a face of a glass article, the apparatus being of the kind comprising support means for an article to be polished, carrier means on which said support is mounted, a rotatable driven member for supporting a polishing head in polishing engagement with said face, first drive means operative to cause relative reciprocatory traversing movement between the driven member and said carrier means, and second drive means operative to cause relative reciprocatory traversing movement between the driven member and said carrier means in a direction traverse to that movement caused by said first drive means, the two traversing movements being of such periods of reciprocation that in a polishing period of normal duration each part of the face of the article is polished to substantially the same extent, characterised in that said support means is mounted on said carrier means so as to permit rotation about an axis and a third drive means operative to cause said support means to oscillate relatively to said carrier means about said axis, and also characterised in that at least one of said drive means is pneumatic and indeterminate to an extent such that the polishing head does not repeatedly follow exactly the same path over the face of the article.

2. Apparatus according to claim 1 in which there is a stand, a first carriage constituting the carrier means and mounted for reciprocatory movement on said stand, and a second carriage supporting the rotatable driven member and mounted for reciprocatory movement on said stand in a direction transverse to said first carriage, the first drive means being operative to reciprocate said first carriage and the second drive means being operative to reciprocate said second carriage.

3. Apparatus according to claim 1 in which the third drive means is operative to oscillate the support means about said axis with a constant amplitude.

4. Apparatus according to claim 1 which includes limit members of elongated form adjustably mountable on the support means so as to approximate to the shape of the face of the glass article to be polished, and sensing members which are fixed relative to the axis of rotation of the driven member and each of which is operative, on sensing the presence of a limit member, to reverse the direction of reciprocation of the first or second drive means so that in use the polishing head is thereby prevented from passing beyond the edge of the face being polished.

5. Apparatus according to claim 4 in which the limit members and sensing members are mounted in positions in which they are free to pass each other, so that in no circumstances could the driving means cause their damage by causing them to collide with each other.

6. Apparatus according to claim 4 in which the sensing members are proximity switches.

7. Apparatus according to claim 1 including flexible coupling means mounted on the driven member, a polishing head mounted on said flexible coupling means which is operative to allow the polishing head to be tilted somewhat from its normal position, and having spring means operative to urge said polishing head towards its normal position.

References Cited
UNITED STATES PATENTS

| | | | |
|---|---|---|---|
| 3,019,564 | 2/1962 | Haracz | 51—56 |
| 2,176,481 | 10/1939 | Waldron | 51—564X |
| 2,195,065 | 3/1940 | Wallace | 51—56X |
| 2,341,524 | 2/1944 | Bezborodko | 51—56 |

FOREIGN PATENTS

| | | | |
|---|---|---|---|
| 972,693 | 10/1964 | Great Britain | 51—56 |

HAROLD D. WHITEHEAD, Primary Examiner

U.S. Cl. X.R.

51—121